US00RE36262E

United States Patent [19]

Jondahl et al.

[11] E Patent Number: Re. 36,262

[45] Reissued Date of Patent: Aug. 3, 1999

[54] ROTATABLE FOOD SERVING HOUSING

[76] Inventors: Kenneth A. Jondahl, 3927 Oregon Ave. North; Brian L. Reed, 3933 Oregon Ave. North, both of New Hope, Minn. 55427

[21] Appl. No.: 08/282,049

[22] Filed: Jul. 28, 1994

Related U.S. Patent Documents

Reissue of:

[64] Patent No.: 5,171,077
Issued: Dec. 15, 1992
Appl. No.: 07/698,826
Filed: May 13, 1991

[51] Int. Cl.[6] ..... A47B 49/00

[52] U.S. Cl. ..... 312/249.3; 312/324

[58] Field of Search ..... 312/249.3, 305, 312/324, 249.2, 284; 211/129, 131; 108/151

[56] References Cited

U.S. PATENT DOCUMENTS

| | | | |
|---|---|---|---|
| D. 160,688 | 10/1950 | Brock | 312/129 X |
| 273,834 | 3/1883 | Gardiner | 312/252 |
| 1,531,198 | 3/1925 | Leckington | 312/252 |
| 1,970,655 | 8/1934 | Iriarte | 312/249.3 |
| 2,978,285 | 4/1961 | Jester | 312/284 |
| 3,364,882 | 1/1968 | Merrick . | |
| 3,695,742 | 10/1972 | Allen . | |
| 3,713,529 | 1/1973 | Meksula . | |
| 3,851,599 | 12/1974 | Bridges . | |
| 4,126,366 | 11/1978 | Handler et al. | 312/252 |
| 4,389,946 | 6/1983 | Hwang . | |
| 4,436,353 | 3/1984 | Tucker . | |
| 4,437,714 | 3/1984 | Struck . | |
| 4,549,664 | 10/1985 | Gowan et al. | 211/131 |
| 4,832,163 | 5/1989 | Levesque . | |
| 4,934,549 | 6/1990 | Allen . | |
| 5,322,023 | 6/1994 | Hammond | 135/16 |

FOREIGN PATENT DOCUMENTS

| | | | |
|---|---|---|---|
| 0449954 | 8/1949 | Italy | 135/16 |

*Primary Examiner*—Peter M. Cuomo
*Assistant Examiner*—Gerald A. Anderson
*Attorney, Agent, or Firm*—Alan Kamrath; Peterson, Wicks, Nemer & Kamrath, P.A

[57] ABSTRACT

A rotatable food serving housing including a rotating base assembly, a base including an umbrella accommodation sleeve and cold ice pack supports, at least two opposing food serving trays, and a cover including opposing hinged flaps for mating with the base, the umbrella accommodation sleeve and the cold ice pack supports.

32 Claims, 8 Drawing Sheets

ROTATABLE FOOD SERVING HOUSING

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention pertains to a rotatable food serving housing, and more particularly, pertains to a food serving tray such as that used on a patio table with a patio umbrella, where the umbrella positions through the food serving tray. The food serving tray also holds cold ice packs, such as those known as Blue Ice, for cooling of the food serving trays.

2. Description of the Prior Art

Prior art food serving trays have generally not provided for refrigeration of the food product, especially over extended periods of time. This has provided for an unsanitary and unhealthy storage of food which may lead to primary and secondary health considerations.

The present invention overcomes the disadvantages of the prior art by providing a rotatable food serving housing with specific space for frozen, cold ice packs.

SUMMARY OF THE INVENTION

*The general purpose of the present* invention is a rotatable food serving housing with hinged covers, removable food trays, and structure for supporting and retaining cold, frozen ice packs, such as those known as "Blue Ice". The food serving trays are removable from the rotatable food serving housing for ease in washing of the food serving trays. The trays engage within the housing and about the frozen, cold ice packs. The food serving housing can also accommodate a patio umbrella, such as for use on a patio table, where the food serving housing is in the center of the table and maintained in position by the umbrella and being inserted through the umbrella support in the rotatable food serving housing.

According to one embodiment of the present invention, there is provided a rotatable base assembly, a base structure affixed to the rotating base assembly including an umbrella support, frozen ice pack supports and food tray supports; two opposing food trays, which engage into the opposing food tray supports; and a corresponding like cover with hinged flaps for engaging about the ice pack supports and the umbrella supports with the base.

The table top revolving food tray or container is 18 inches in diameter. Two easy open/close hinged lids, one lid per side, keep din/insects away from the food inside, and also hold the cool air inside. Two frozen ice packs inside help prevent food spoilage and extend the time in which food can be enjoyed. The container has a large hole in the center that an umbrella pole can slide through (up to 1⅞" diameter pole) in order to save space on picnic tables. Separate food trays for easy clean up can be used inside or out. This invention implements especially well on picnic tables.

The revolving tray can be placed in the center of the picnic table with an umbrella pole through the center to save space on the table top. Two ice packs are positioned inside to help preserve freshness of food for longer periods of time. Two large food trays (each divided into 3 separate compartments) allow transportation of different foods to locations which saves trips back and forth. Lids open easily and stay open for easier access to food. Lids also close easily without having to latch covers onto containers. The revolving tray brings all food into easy reach of all persons sitting around most sized tables.

Significant aspects and features of the present invention include a rotatable food serving housing for maintaining food serving trays in position with respect to cold, frozen ice packs in the food serving housing.

Another significant aspect and feature of the present invention is a rotatable food serving housing which accommodates a patio umbrella and rotates about the patio umbrella, which extends through the food serving housing.

A further significant aspect and feature of the present invention is a food serving housing which retains cold, frozen ice packs in position with respect to the food trays and the food serving housing.

Further significant aspects and features include a hole through the center which accepts an umbrella pole up to 1⅞" diameter. Two (6½"×3¾"×1½" thick) ice packs are used to keep food cool and fresh. The revolving tray allows everyone at the table easy access to all food inside. Easy to open/close lids [keeps] *keep* dirt and insects away from the food.

Having thus described the embodiments of the present invention, it is the principal object hereof to provide a food serving housing with removable trays, cold, frozen ice pack accommodating structures, and a patio umbrella accommodating structure for centering the food serving housing about the center of a patio table when a patio table umbrella is in use.

One object of the present invention is a food serving housing which readily accommodates the cold, frozen ice packs.

Another object of the present invention are food serving trays which are easily removable for cleaning and exchanging of food.

Other objects of the present invention include hinged covers on each side of the tray which are easy to open and close, and maintain freshness of food and keep dirt and insects out. The rotating tray adds convenience to all parties setting around patio tables and eliminates reaching or passing of food. The rotating tray rotates around the umbrella pole to save table space.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
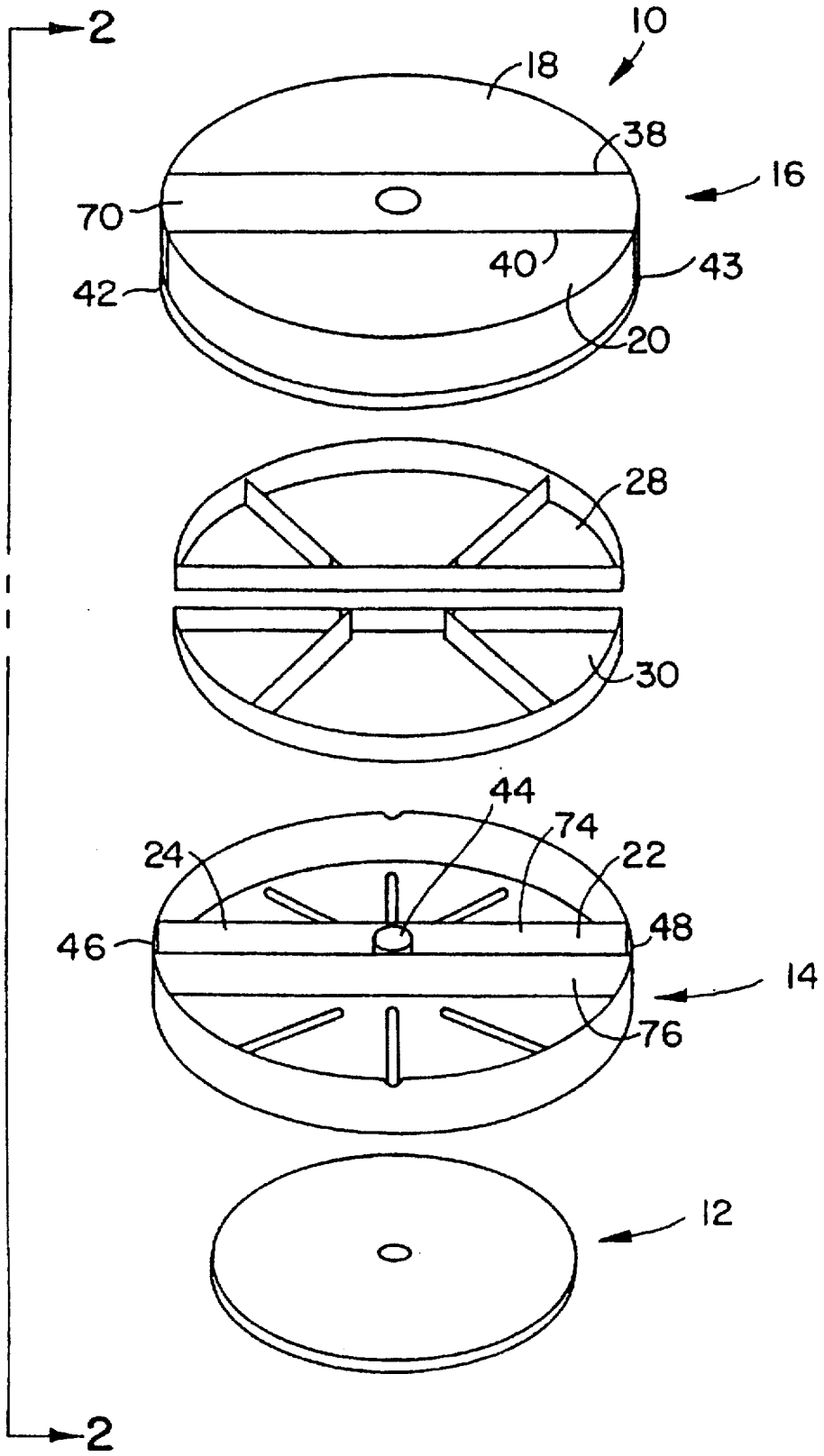
FIG. 1 illustrates an exploded view in perspective of the rotatable food serving housing, *the* present invention.
Figure 4:
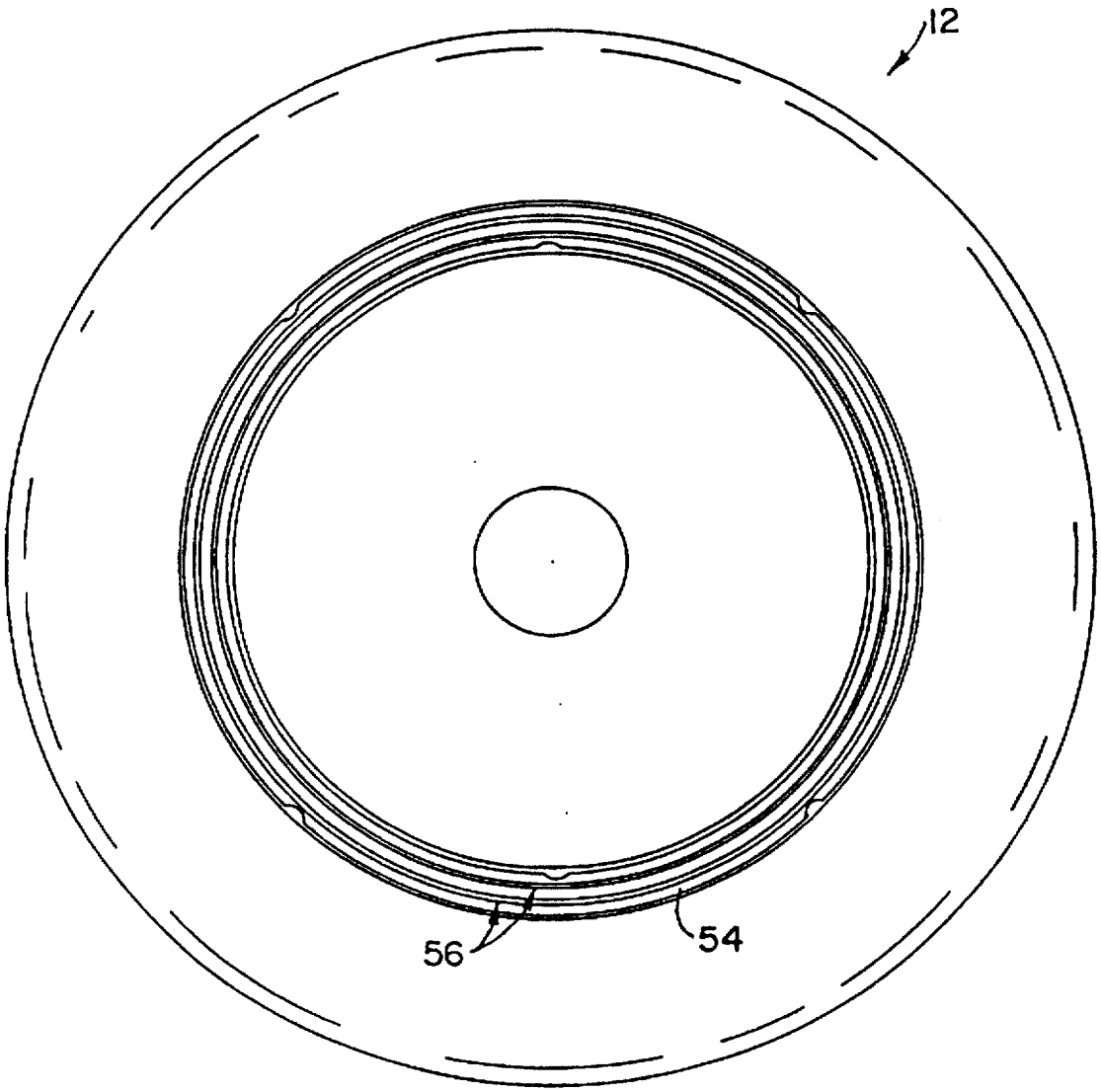
FIG. 4 illustrates a bottom view of the lower housing.
Figure 5:
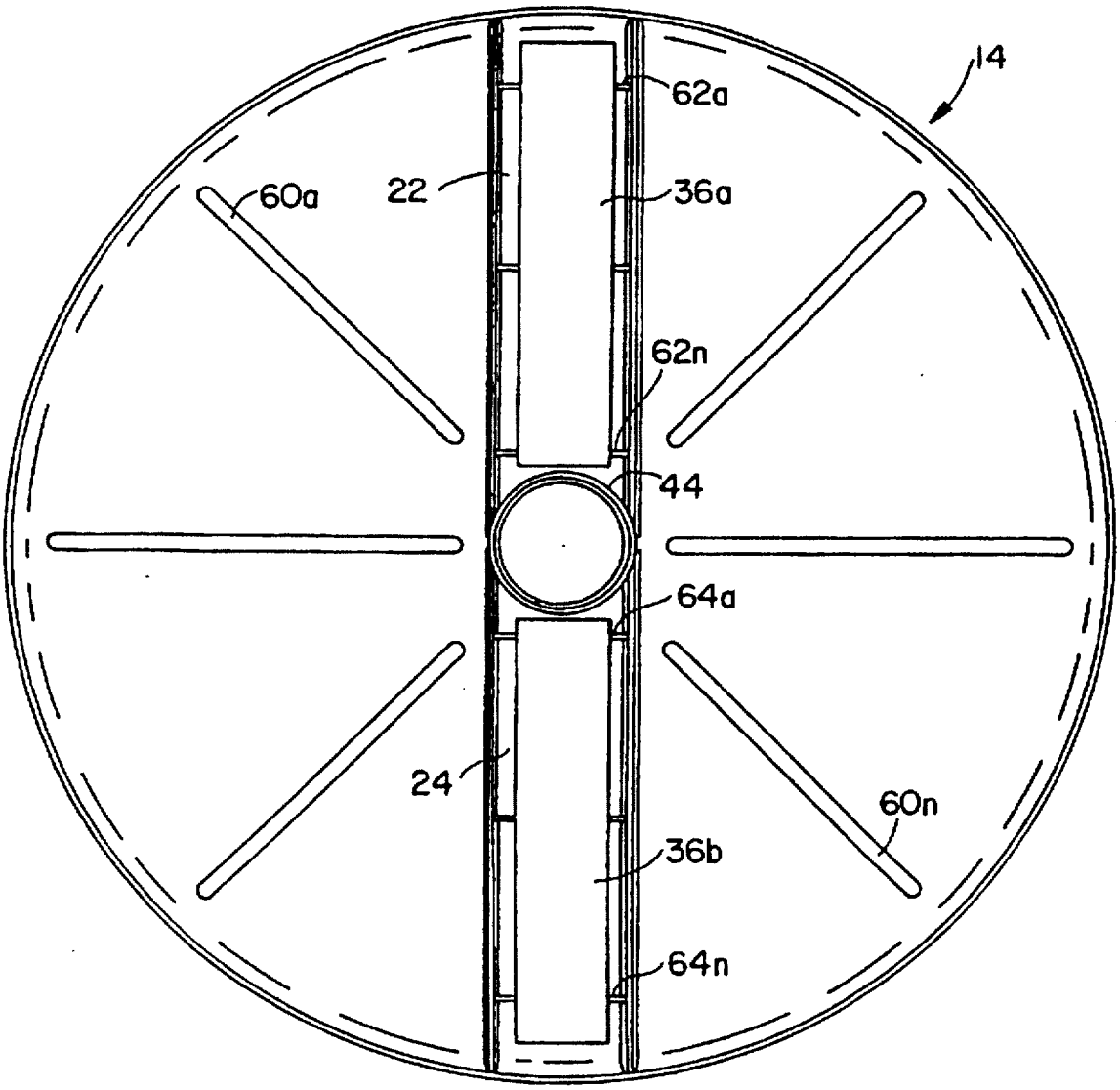
FIG. 5 illustrates a top view of the lower housing with the cover removed and food trays removed.

FIG. 1 illustrates an exploded view in perspective of a rotatable food serving housing 10, the present invention, including a swivel base 12, a lower housing 14, an upper housing 16 with hinged flaps 18 and 20. The flaps 18 and 20 pivot about the hinges 38 and 40. Suitable snap assemblies or other securing assemblies can be used to attach and align the ends of the upper housing 16 at points 42 and 43 to the opposing ends of the lower housing 14 at points 46 and 48 so that the rotatable food serving housing 10 is an integral unit with respect to food trays 28 and 30 disposed therein, the lower housing 14, and the upper housing 16. This alignment insures that the flaps 18 and 20 will align properly with the food trays 28 and 30 contained between the lower and upper housings 14 and 16, respectively. The swivel base 12 is that commonly available or used in other products, which includes a large circular ring 54, and a bearing ring 56 which rides on an inside track of a smaller ring and which rotates within the large circular ring 54 as illustrated in FIG. 4. The lower housing 14 includes two compartments 22 and 24 for retaining frozen, cold ice packs *36a and 36b, respectively*, commonly known as "Blue Ice" as illustrated in FIG. 5. Removable compartmentalized food trays 28 and 30 align in the lower housing 14. A cylindrical sleeve [44] *or shaft 44a* for aligning about an umbrella pole 58 aligns through the center of the lower housing 14 between the compartments 22 and 24. The umbrella pole can be that type of an umbrella pole associated with a patio pole umbrella.

Figure 2:
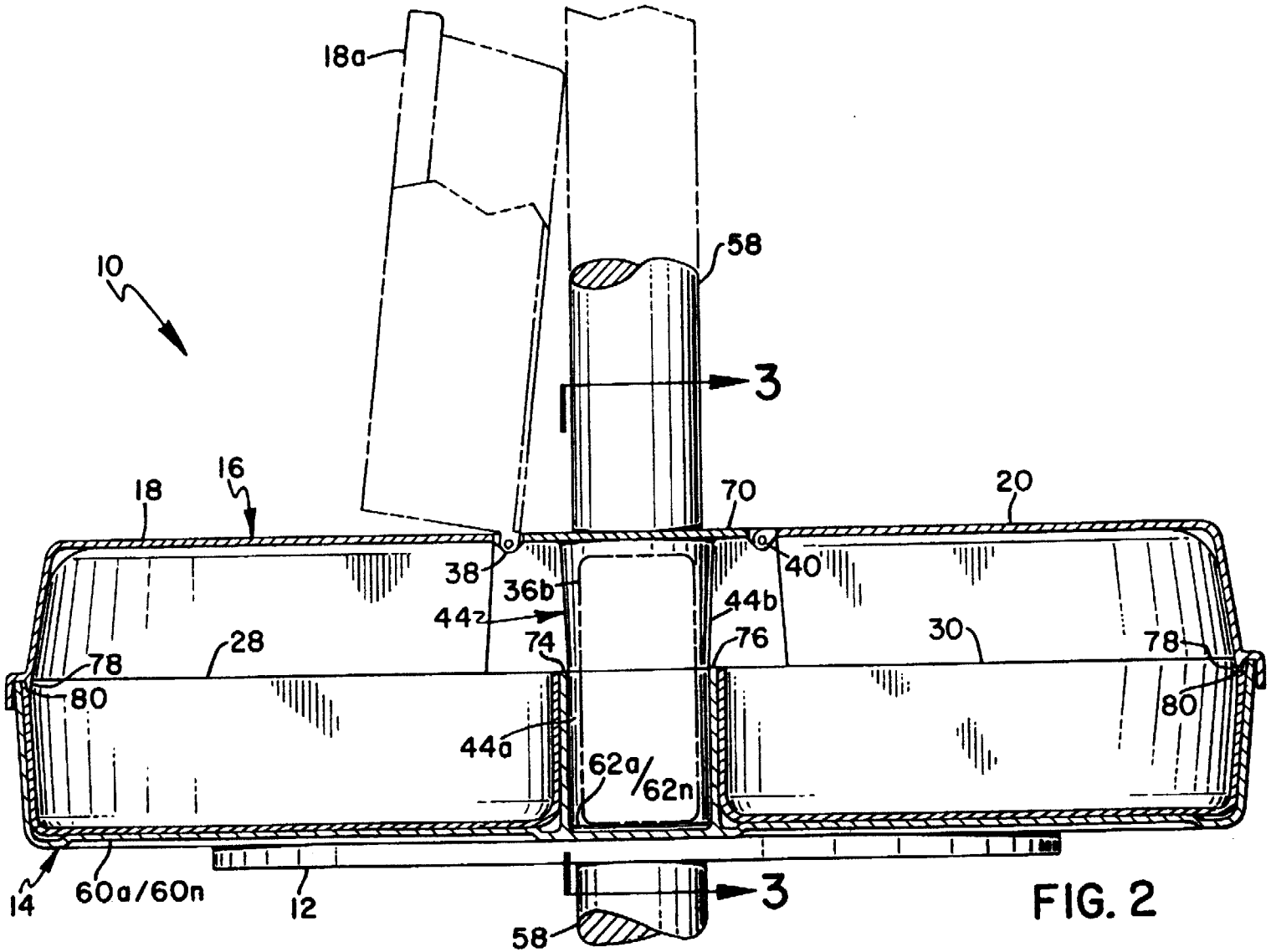
FIG. 2 illustrates a side view in partial cross section of the assembled rotatable food serving housing.
Figure 6:
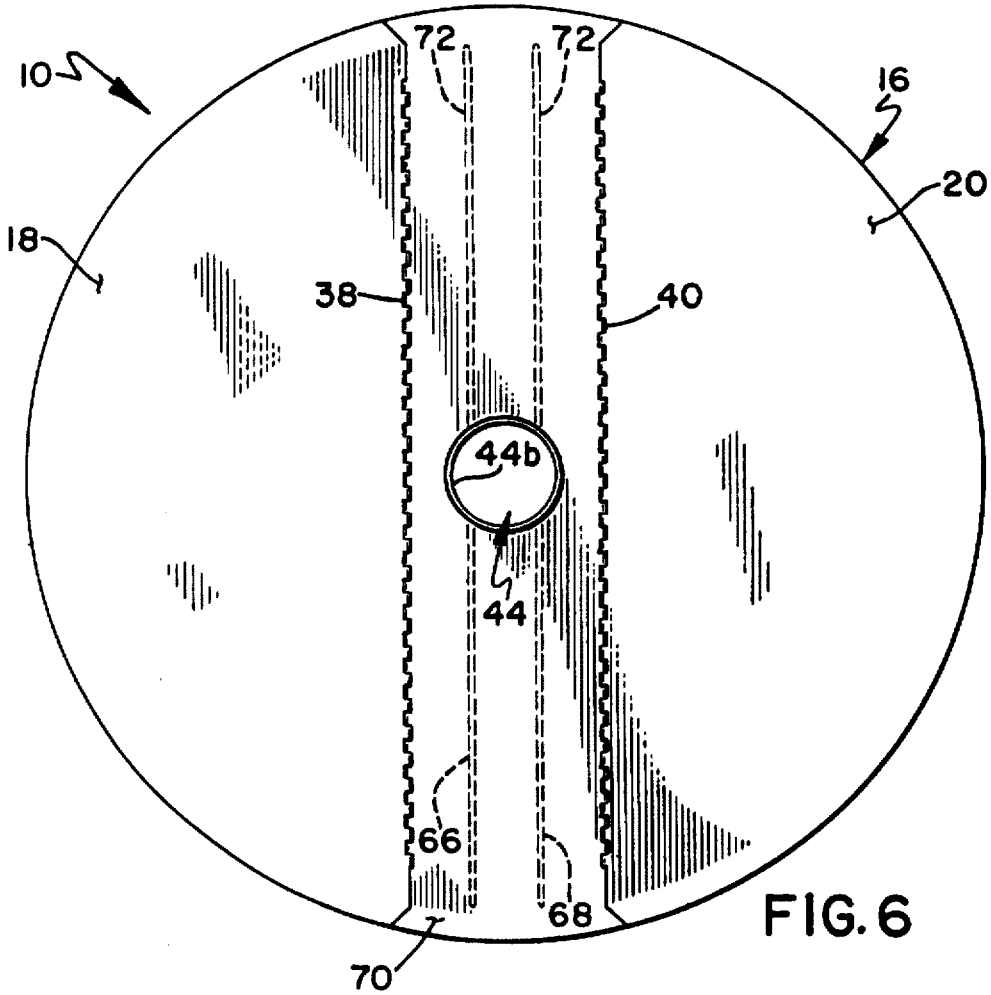
FIG. 6 illustrates a top view of the upper housing.

FIG. 2 illustrates a side view in partial cross section of the assembled rotatable food serving housing 10 along line 2—2 of FIG. 1 where all numerals correspond to those elements previously described. The hinged flap 18 can be rotated upwardly about the hinge 38 to position 18a as illustrated by dashed lines for gaining access to the compartmentalized food tray 28 which is illustrated residing in the lower housing 14. The hinged flap 20 operates in a like manner. An ice pack 36b is contained in compartment 24 [and held in place at its top end by support] members 66 and 68 [extending] *extend* downwardly from the central portion 70 of the upper housing 16. Like [support] members [70 and] 72 extend downwardly from the central portion 70 of the upper housing 16 as illustrated in FIG. 6.

Figure 3:
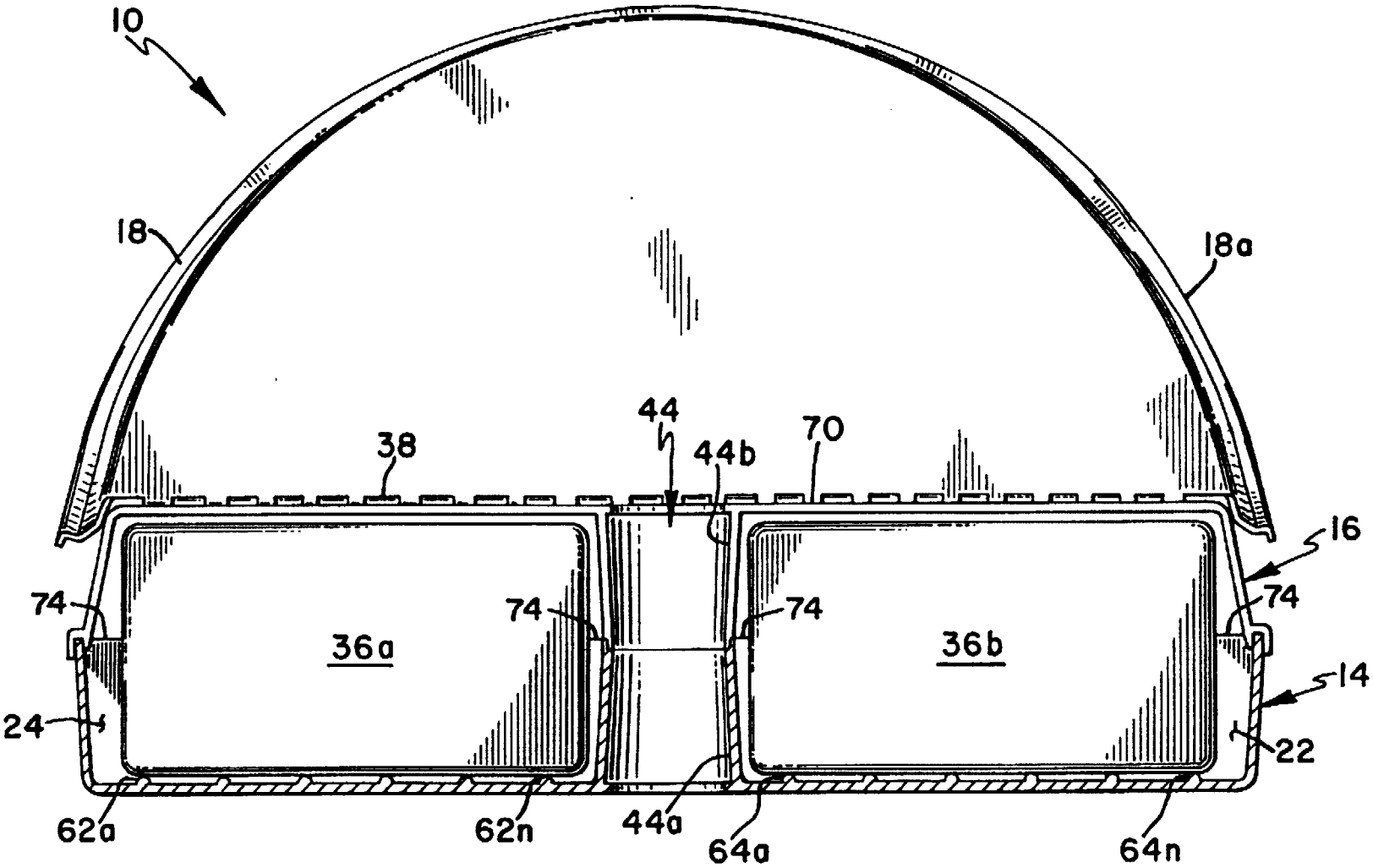
FIG. 3 illustrates a view in partial cross section of the rotatable food serving housing along line 3—3 of FIG. 2.

FIG. 3 illustrates a view along line 3—3 of FIG. 2 in partial cross section of the rotatable food serving housing 10 where all numerals correspond to those elements previously described. What is particularly illustrated is the placement of the ice packs 36a and 36b with respect to the food tray and the umbrella pole [housing] *accommodation tube* 44.

FIG. 4 illustrates a bottom view of the lower housing 14, particularly illustrating the swivel base 12 and the swivel assembly including the large circular [member] *ring* 54 and bearing ring 56.

FIG. 5 illustrates a top view of the lower housing 14 with the upper housing 16 and food trays 28 and 30 removed and particularly illustrates a plurality of dead air space inserts or rises 60a–60n to create a dead air space between the bottom of the food trays 28 and 30 and the base of the lower housing 14. This elevates the food trays 28 and 30 off the base of the bottom of the lower housing 14 and provides an insulative dead air space. A plurality of dead air space inserts or rises 62a–62n and 64a–64n align in the compartments 22 and 24, respectively, to create insulative dead air space beneath the ice packs 36a–36b.

FIG. 6 illustrates a top view of the upper housing 16 of a food serving housing 10, and particularly illustrates the hinges 33 and 40, as well as the placement of the [ice pack support] members 66–72 on the underside of the upper housing 16.

Figure 7:
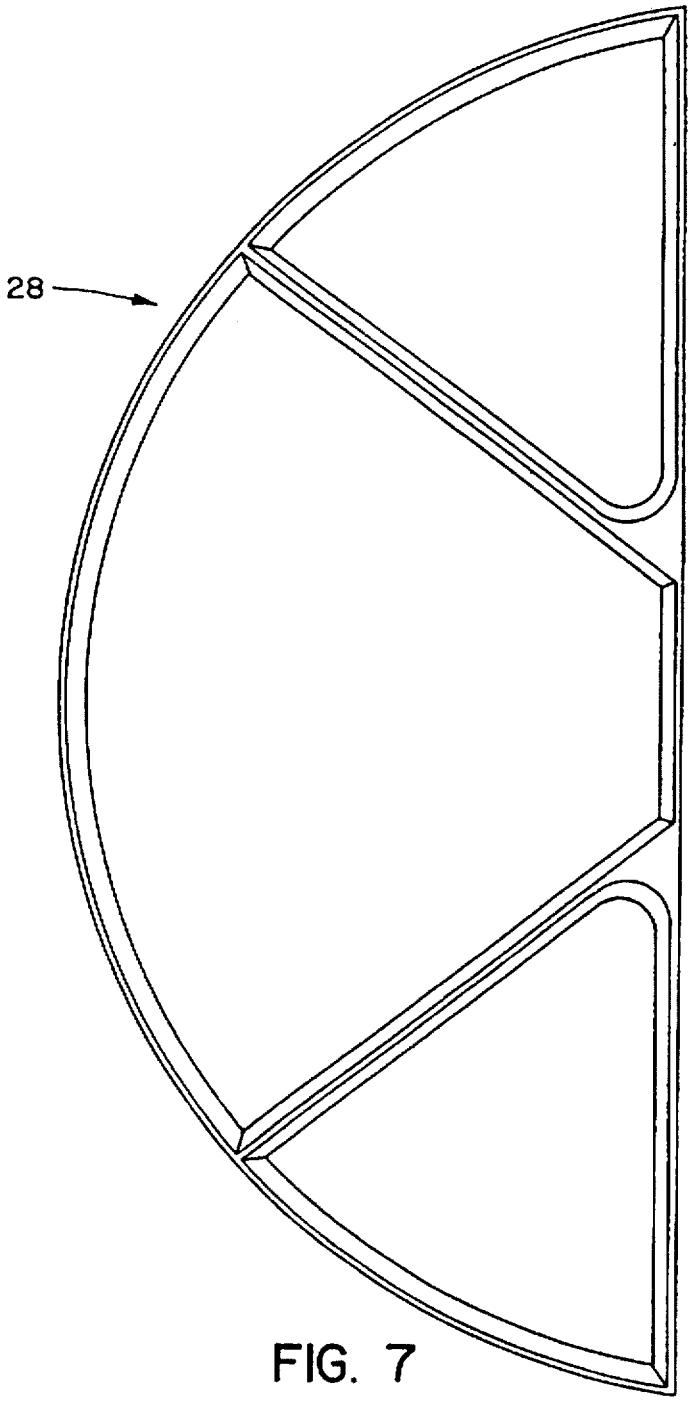
FIG. 7 illustrates a top view of a food tray.

FIG. 7 illustrates a top view of a food tray 28 particularly illustrating the three compartments. The three compartments are for purposes of illustration only and any desired number of compartments in different shapes may be used and shall not be construed to be limiting of the scope of the invention. The compartments can also be made to accommodate small beverage cans in lieu of food, or can be entirely removed to accommodate normal sized beverage cans. The outside dimensions of the food tray 28 are critical for placement within the lower housing 14 with respect to the rotatable food serving housing 10.

Figure 8:
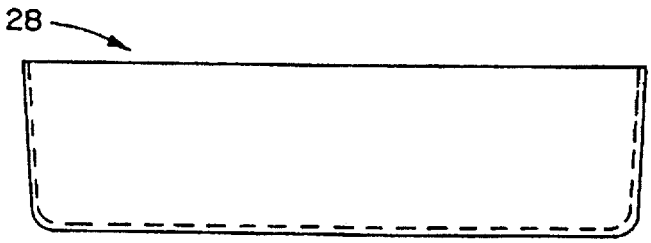
FIG. 8 illustrates an end view of the food tray.

FIG. 8 illustrates an end view of FIG. 7 where all numerals correspond to those elements previously described.

Figure 9:
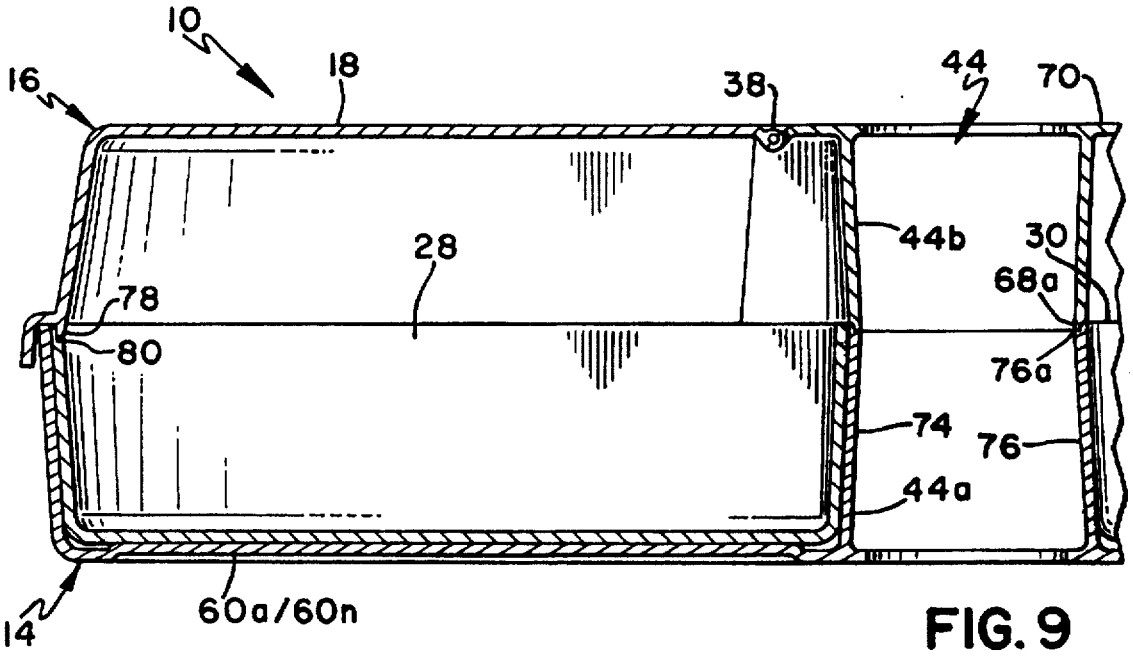
FIG. 9 illustrates a cross section of the hinged flap and the umbrella mast accommodation [hole] *tube*.

FIG. 9 illustrates a cross-sectional view of the hinged flap 18 and the umbrella mast accommodation [hole] *tube* 44. [Vertically aligned supports 66 and 68 extend] *A vertical sleeve or shaft 44b extends* downwardly *from central portion 70 of the upper housing 16* to mate with [vertical] *the shaft 44a of the lower housing 14. Vertical* support member 74 and 76 extending upwardly from the lower housing 14 *on opposite sides of the shaft 44a form the compartments 22 and 24*. Support [extensions 66a and] 68a [mate] *mates* with support [extensions 74a and] *extension* 76a to form *a* lap [joints] *joint*. A tab 78 extends downwardly from hinged flap 18 and is accommodated by a recess 80 in the food tray 28 for integral stability of the unit. A like tab and recess in the hinged flap 20 align in a similar manner.

DESCRIPTION OF THE ALTERNATIVE EMBODIMENT

Figure 10:
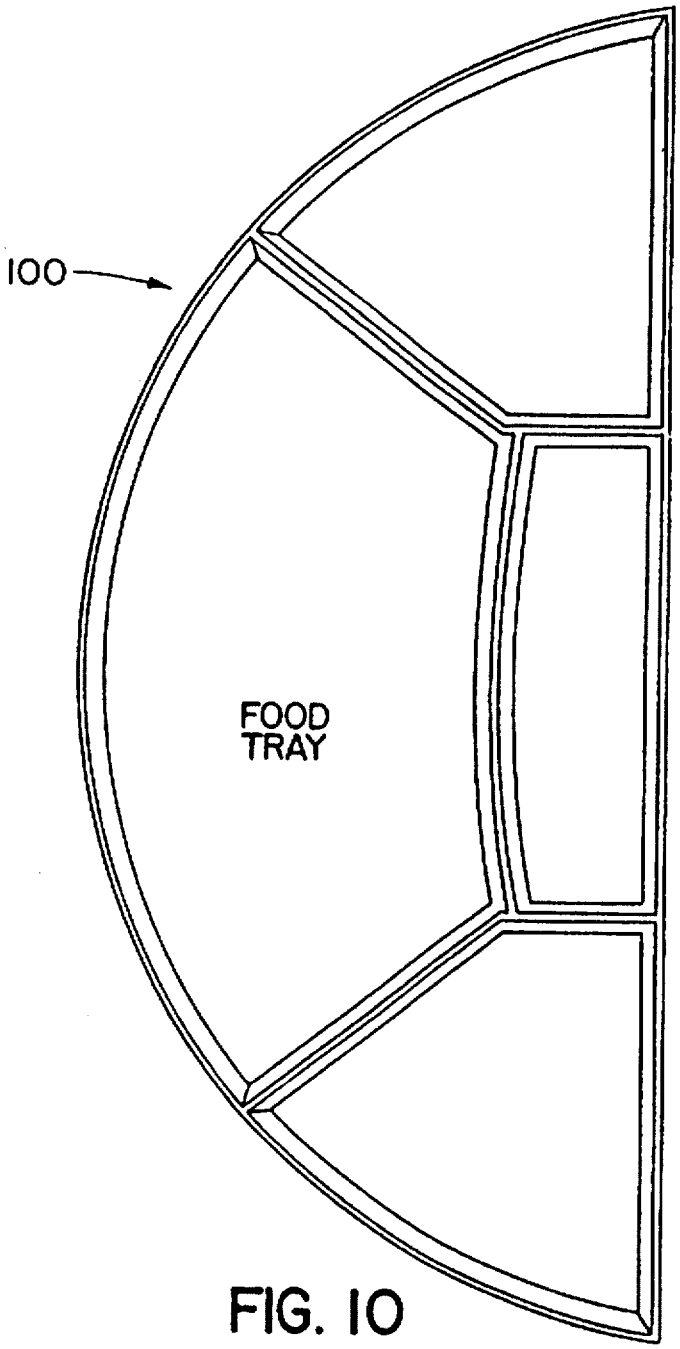
FIG. 10 illustrates a top view of an alternative embodiment of a food tray; and, FIG. 11 illustrates an end view of an alternative embodiment of a food tray.

FIG. 10 illustrates a top view of an alternative embodiment of a food tray 100 incorporating four compartments. All other dimensions of the food tray 100 are identical to those as illustrated in FIG. 7.

Figure 11:
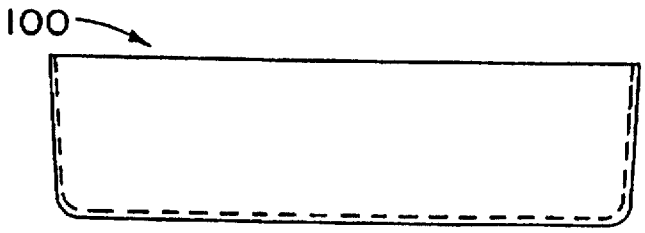

FIG. 11 illustrates an end view of FIG. 10.

MODE OF OPERATION

The 18" diameter [rotating] *rotatable* food serving housing 10 includes two easy to open hinged flaps 18 and 20 on the upper housing 16. The hinged flaps help keep cool air in, and insects, dirt and air currents out which cause the food to lose freshness quickly. There are two ice packs 36a–36b which fit inside the ice pack compartments 22 and 24 to keep food cool and fresh longer. Results of testing show that these ice packs will keep the food fresh and enjoyable for 3 to 3½ hours under adverse conditions, such as 90° F.@85% humidity. Obviously, the food will stay fresh longer under more ideal conditions.

There is a 2" diameter umbrella accommodation tube 44 running through the food serving housing 10 which allows the shaft from any purchased umbrella to pass through. The accommodation tube 44 fits closely about an umbrella mast to seal the interior of the rotatable food serving housing 10 from outside air and also to keep the cooled interior air within the confines of the housings. This saves a large amount of space on the top of a picnic table, which is normally wasted due to the shape of typical food containers and the fact that they must be placed around an umbrella shaft.

There are also two removable food trays 28 and 30 inside which can be filled on site or refilled in a residence, and brought outside in one trip making entertaining or relaxing outside easier. Since all the food is kept in these easily removable trays, clean up after using is readily accomplished. If one or both trays 28 or 30 are left out, there is also room for 6 beverage cans (12 oz.) on each side.

Various modifications can be made to the present invention without departing from the apparent scope hereof.

[I] *We* claim:

1. Rotatable food serving housing comprising:

a. a base including opposing semicircular compartments generally forming a circle about a first central hole, with a space generally bisecting the circle on a diameter therebetween;

b. a swivel means on an underside of said base;

c. a semicircular food tray including a plurality of compartments for engaging into each of said semicircular compartments; and, d. a top including two opposing hinged covers engaging with said base and a second central hole extending therethrough for aligning with the first central hole.

2. The rotatable food serving housing of claim 1 including lower and upper shafts in said base and said top about said central holes for receiving an umbrella pole

3. The rotatable food serving housing of claim 2 including means aligning said lower and upper shafts.

4. The rotatable food serving housing of claim 1 including food cooling means in said space.

5. The rotatable food serving housing of claim 1 including means for aligning said top to said base about edges of said base and said top.

6. The rotatable food serving housing of claim 1 wherein said base, said top and said trays are of a polymer.

7. Rotatable food serving housing comprising:

a. a base including opposing semicircular compartments generally forming a circle about a first central hole, with a space generally bisecting the circle on a diameter therebetween;

b. a swivel means on an underside or said base;

c. two opposing semicircular food trays including at least one food or can area for engaging into each of said semicircular compartments; and, d. a top including two opposing hinged covers engaging with said base and a second central hole extending therethrough for aligning with the first central hole.

8. The rotatable food serving housing of claim 7 including lower and upper shafts in said base and said top about said central holes for receiving an umbrella pole.

9. The rotatable food serving housing of claim 8 including means aligning said lower and upper shafts.

10. The rotatable food serving housing of claim 7 including food cooling means in said space.

11. The rotatable food serving housing of claim 7 including means for aligning said top to said base about edges of said base and said top.

12. The rotatable food serving housing of claim 7 wherein said base, said top and said trays are of a polymer.

13. Rotatable food serving housing comprising:

a. a base including opposing semicircular compartments generally forming a circle about a first central hole, with a space generally bisecting the circle on a diameter therebetween for holding food cooling means;

b. a swivel means on an underside of said base;

c. a semicircular food tray including at least one food or can area for engaging into each of said semicircular compartments;

d. a top including two opposing hinged covers engaging with said base and a second central hole extending therethrough for aligning with the first central hole; and, e. means for engaging said top to said base.

14. The rotatable food serving housing of claim 13 including lower and upper shafts in said base and said top about said central holes for receiving an umbrella pole.

15. The rotatable food serving housing of claim 14 including means aligning said lower and upper shafts.

16. The rotatable food serving housing of claim 13 including means for aligning said top to said base about edges of said base and said top.

*17. Food serving housing rotatable about a pole comprising, in combination: a base having an outer circumferential wall portion; a top, with the base and the top attached together defining an interior for confining air; an accommodation tube formed in the top and the base for slideably and rotatable receiving the pole; at least a first cover formed in the top allowing access to the interior when the base and the top are attached together and when the pole is slideably and rotatably received in the accommodation tube; at least a first food compartment formed in the base and within the interior for placement of food; and at least a first ice pack compartment formed in the base and separated from the first food compartment by a divider wall extending from the accommodation tube to the outer circumferential wall portion of the base and within the interior with the first food compartment and defining a specific space for placement of ice packs with the air cooled by the ice packs being in free fluid communication, in a zone defined above the divider wall and below the top to adjacent the outer circumferential wall portion of the base, with the first food compartment and confined within the interior for keeping food in the first food compartment of the interior cool and fresh.*

*18. The rotatable food serving housing of claim 17 further comprising, in combination: a swivel means on an underside of the base.*

*19. The rotatable food serving housing of claim 17 including a snap assembly formed at least on the top and separate from the cover for attaching and aligning said top to said base about edges of said base and said top.*

*20. The rotatable food serving housing of claim 17 wherein the first cover is hinged to the top.*

*21. The rotatable food serving housing of claim 20 further comprising, in combination: a food tray removably received in the base and inside of the first food compartment of the interior.*

*22. The rotatable food serving housing of claim 17 further comprising, in combination: a second ice pack compartment in the interior and defining a specific space for placement of ice packs, with the accommodation tube separating the first and second ice pack compartments in the interior, with the first and second ice compartments being on opposite sides of the accommodation tube, with air cooled by the ice packs of both the first and second ice pack compartments being confined within the interior.*

*23. The rotatable food serving housing of claim 22 wherein the first and second ice pack compartments and the accommodation tube bisect the base into first and second food compartments for containing food.*

*24. The rotatable food serving housing of claim 23 further comprising, in combination: first and second food trays for receipt in the first and second food compartments of the base.*

*25. The rotatable food serving housing of claim 24 wherein said base, said top and said trays are of a polymer.*

*26. Food serving housing rotatable about a pole comprising, in combination: a base having an outer circumferential wall portion; a top, with the base and the top being attached together and defining an interior; at least a first cover formed in the top allowing access to the interior when the base and the top are attached together; an accommodation tube formed in the top and the base for slideably and rotatable receiving the pole; at least first and second compartments in the interior for placement of food; at least a first space in the interior for placement of ice packs with the base and the top confining the air cooled by the ice pack within the interior for keeping food in the first compartment of the interior cool and fresh; a second space in the interior for placement of ice packs for keeping food in the interior cool and fresh, with the accommodation tube separating the first and second spaces, with the first and second spaces being on opposite sides of the accommodation tube, wherein the first and second spaces and the accommodation tube bisect the base into the first and second compartments for containing food; and a second cover formed in the top, with the first cover allowing access to the first compartment and the second cover allowing access to the second compartment of the interior, with the first and second spaces being separated from the first and second compartments by at least one divider wall extending from the accommodation tube to the outer circumferential wall portion of the base, with the divider wall means being spaced below the top within the interior such that air cooled by the ice packs is in free fluid communication, in a zone defined above the at least one divider wall and below the top to adjacent the outer circumferential wall portion of the base.*

*27. Food serving housing rotatable about a pole comprising, in combination: a base having an outer circumferential wall portion; a top, with the base and the top being attached together and defining an interior: at least a first cover formed in the top allowing access to the interior when the base and the top are attached together; an accommodation tube formed in the top and the base for slideably and rotatable receiving the pole; at least a first compartment in the interior for placement of food; at least a first space in the interior for placement of ice packs with the base and the top confining the air cooled by the ice pack within the interior for keeping food in the first compartment of the interior cool and fresh; and a second space in the interior for placement of ice packs for keeping food in the interior cool and fresh, with the first and second spaces being separated from the first compartment by at least one divider wall extending from the accommodation tube to the outer circumferential wall portion of the base, with the at least one divider wall being spaced below the top within the interior such that air cooled by the ice packs is in free fluid communication, in a zone defined above the divider wall and below the top to adjacent the outer circumferential wall portion of the base, with the first compartment, with the accommodation tube separating the first and second spaces, with the first and second spaces being on opposite sides of the accommodation tube, wherein the accommodation tube includes a lower shaft integrally formed in the base and an upper shaft integrally formed in the top for receiving the pole.*

*28. The rotatable food serving housing of claim 27 including means formed on at least one of the lower and upper shafts for aligning said lower and upper shafts.*

*29. Food serving housing rotatable about a pole comprising, in combination: a base having an outer circumferential wall portion; a top, with the base and the top attached together defining an interior for confining air; at least a first cover formed in the top allowing access to the interior when the base and the top are attached together; an accommodation tube formed in the top and the base for slideably and rotatably receiving the pole, with the accommodation tube extending centrally through the interior while confining air within the interior; at least a first food compartment in the interior for placement of food; and at least a first space in the interior for placement of ice packs, with the first space being separated from the first compartment by divider wall extending from the accommodation tube to the outer circumferential wall portion of the base, with the divider wall being spaced from the top within the interior such that air cooled by the ice packs is in free fluid communication, in a zone defined above the divider wall and below the top to adjacent the outer circumferential wall portion of the base, thereby confining the air cooled by the ice pack within the interior for keeping food in the first food compartment of the interior cool and fresh.*

*30. The rotatable food serving housing of claim 29 further comprising, in combination: a second food compartment in the interior with the first food compartment, with the first and second food compartments being on opposite sides of the accommodation tube.*

*31. The rotatable food serving housing of claim 30 further comprising, in combination: a second space in the interior for placement of ice packs for keeping food in the interior cool and fresh, with the accommodation tube separating the first and second spaces, with the first and second spaces being on opposite sides of the accommodation tube, with the first and second spaces and the accommodation tube bisecting the base into the first and second food compartments.*

*32. The rotatable food serving housing of claim 30 wherein the accommodation tube includes a lower shaft integrally formed in the base and an upper shaft integrally formed in the top for receiving the pole.*

* * * * *